United States Patent [19]

Bretthauer et al.

[11] Patent Number: 4,683,577

[45] Date of Patent: Jul. 28, 1987

[54] METHOD AND APPARATUS FOR REGULATING ARC DISCHARGE FURNACE

[75] Inventors: Karlheinz Bretthauer; Hans-Dietrich Obenauf, both of Clausthal-Zellerfeld, Fed. Rep. of Germany

[73] Assignee: Fried. Krupp Gesellschaft mit beschränkter Haftung, Essen, Fed. Rep. of Germany

[21] Appl. No.: 847,921

[22] Filed: Apr. 3, 1986

[30] Foreign Application Priority Data

Apr. 3, 1985 [DE] Fed. Rep. of Germany ....... 3512189

[51] Int. Cl.$^4$ ........................................... H05B 7/148
[52] U.S. Cl. .................................................. 373/105
[58] Field of Search ............... 373/104, 105, 102, 106, 373/108

[56] References Cited

U.S. PATENT DOCUMENTS 3,435,121 3/1969 Jackson .............................. 373/105

FOREIGN PATENT DOCUMENTS 1159112 12/1963 Fed. Rep. of Germany .

Primary Examiner—Roy N. Envall, Jr.
Attorney, Agent, or Firm—Spencer & Frank

[57] ABSTRACT

A method and apparatus for regulating an arc discharge furnace having a lining, a plurality of electrodes disposed above a bath of conductive material, an adjustable transformer for applying to each electrode a voltage which causes an arc current proportional to the applied transformer voltage to flow between the electrode and the bath, a device for varying the voltage applied by the transformer to each electrode, and a device for varying the vertical spacing between each electrode and the bath. Desired values for a maximum of two of the following parameters are selected: the voltage of the arc current produced by one electrode; the arc current produced by the one electrode; the power of the arc produced by the one electrode; a parameter which is proportional to the wear caused to the furnace lining by the arc produced by the one electrode; and a correcting variable for the voltage applied to the one electrode by the transformer. The voltage varying device and the electrode spacing varying device are each controlled on the basis of a selected parameter.

17 Claims, 3 Drawing Figures

FIG.1

| Given Values | Transformer Voltage | Arc Voltage | Current | Power | Wear |
|---|---|---|---|---|---|
| Transformer Voltage | | →12 | →17 | | →16 |
| Arc Voltage | ↓11 | | →12 | →12 | |
| Current | ↓11 | ↑17 | | →17 | →16 |
| Power | | ↓14 | ↑14 | | →16 |
| Wear | ↓11 | | ↓17 | ↓14 | |

13 — Electrode Height Adjustment

15 — Transformer Voltage Regulating Element

METHOD AND APPARATUS FOR REGULATING ARC DISCHARGE FURNACE

BACKGROUND OF THE INVENTION

The present invention relates to a method for regulating arc discharge furnaces which operate with adjustable transformer voltages and adjustable electrode height levels and with an arc voltage regulation which acts directly on the electrode adjustment.

An arc discharge furnace operates with two correcting variables: the transformer voltage or furnace voltage, which can be set at the transformer with the aid of a stepping switch; and the height position of the supporting arm, i.e. the height of the tip of the electrode above the bath (scrap), a factor determinative for the length of the developing arc.

If one disregards asymmetries and their possible compensation by different correcting variables in the three operating power phases, then it is possible to set only two operating parameters independent of one another by means of two regulating elements. For practical furnace operation, the correcting variables of interest could be: the length of the arc, which is approximately proportional to the arc voltage; the arc current; the arc power; and a variable characteristic for the amount of wear of the furnace lining which is calculated from the arc current and the arc voltage. The furnace voltage (transformer voltage), however, can be used only as a correcting variable and not as a regulating parameter since the furnace voltage can serve only as an auxiliary value for the performance of the furnace process.

In practice, the furnace voltage, and thus the transformer setting, is frequently given by the process program. In such cases, the only degree of freedom existing is the setting of the electrode height, i.e. the length of the arc and the arc voltage. For these settings, i.e. the electrode adjustment, the so-called impedance regulation process is employed primarily, i.e. for each electrode there is formed the quotient of the voltage measured between arc current path and the neutral point of the bath divided by the current of the respective arc current path. The quotient value is then the actual value for the impedance regulation. Aside from the fact that this type of regulation has the correct influence on the electrode height level only if the deviations form normal operating states are not too great, this method has the drawback that the impedance is not a reliable measure for arc length.

DE-AS [Federal Republic of Germany Published Application] No. 1,159,112 discloses a power regulation procedure in which the arc length which results in maximum arc power is to be found in that the peak value of the arc voltage to be measured has a certain relationship to the mains voltage. The uncertain manner of compiling the measured values disclosed in this reference already has the result that the object of the invention disclosed in that earlier application is not, or only incompletely, achieved.

Finally, DE-AS No. 2,440,960 discloses wear regulation in an arc furnace in which the actual arc voltage value obtained from a measurement and a value formed of a desired value for the arc resistance and the arc current by means of a multiplier are fed as the desired value to an arc voltage regulator on which is superposed a value which represents the furnace lining wear coefficient as a function of the arc voltage and the arc current, with the output signal of that device forming an additional desired state value for the arc voltage regulator.

Aside from these regulating proposals, some of which have considerable drawbacks, the prior art does not provide an unequivocal teaching of a method for regulating arc discharge furnaces in which the regulating variables are to be used during the corresponding operating states of the arc discharge furnace and with the given values.

SUMMARY OF THE INVENTION

It is therefore an object of the present invention to regulate arc furnaces with the aid of accurate, economical and inexpensively achievable adjustment of the arc voltage and of the electrode height setting and to provide apparatus for effecting such regulation.

The above and other objects are achieved, according to the invention, by a method and apparatus for regulating an arc discharge furnace having a lining, a plurality of electrodes disposed above a bath of conductive material, adjustable transformer means connected for applying to each electrode a voltage which causes an arc current proportional to the applied transformer voltage to flow between the electrode and the bath, voltage varying means for varying the voltage applied by the transformer to each electrode, and electrode height adjusting means for varying the vertical spacing between each electrode and the bath. The invention is implemented by:

selecting desired values for a maximum of two of the following parameters: $U_B$, which is the voltage of the arc current produced by at least one electrode; $i_B$, which is the arc current produced by at least one electrode; $U_B \cdot i_B$, which is the power of the arc produced by the at least one electrode; $U_B^2 \cdot i_B$, which is proportional to the wear caused to the furnace lining by the arc produced by the at least one electrode; and a correcting variable for the voltage applied to the at least one electrode by the transformer;

controlling the voltage varying means for varying the voltage applied by the transformer to the one electrode as a function of a first one of the selected desired values; and controlling the height adjusting means for varying the vertical spacing between the one electrode and the bath as a function of the second one of the selected desired values.

Accordingly, a maximum of two of the freely selectable regulating variables including the arc voltage, the arc current, the arc power and the amount of wear on the two regulating elements are to act on the setting members for transformer voltage and electrode adjustment. The furnace voltage can merely serve as a correcting variable for the transformer voltage. The arc power regulation here should always have an effect on the regulating element for the transformer voltage; a wear regulation always acts on the regulating element for the electrode height; and a current regulation always acts on the remaining regulating element. With the transformer voltage fixed, either the arc voltage or the current (or the wear, as mentioned above) is regulated by adjusting the arc length. If the arc voltage is set by adjusting the arc length, the current (or the power) is set by adjusting the transformer voltage.

According to the above teaching, there are eight available combinations: three combinations in which the transformer voltage is fixed and the arc voltage, the current or the wear is set by adjusting the arc length; two combinations in which the arc voltage is set by adjusting the arc length and either the current or the power is set by adjusting the transformer voltage. In the combination of arc current and power, the current is set by adjusting the arc length and the power by adjusting the transformer voltage. If one combines the arc current with the wear value, the wear is set by adjusting the arc length, and the current by adjusting the transformer voltage. Finally, in a final combination it is also possible to set the wear by adjusting the arc length and the power by adjusting the transformer voltage. The combinations of power with furnace voltage (transformer voltage) and wear with arc voltage must be excluded. The associations or exclusions of the above-mentioned regulating arrangement are explained as follows:

The arc power is the average over time of the product of arc voltage and arc current which can be obtained from measurements. An arc power regulation which would have a direct influence on the electrode adjustment would inevitably be unstable and is therefore eliminated in any case. Arc power regulation serving as reference value for the arc voltage regulation is not unequivocal in its direction of action, as is evident by the circuit diagram for the arc discharge furnaces. There are a plurality of operating states for one and the same arc power at which the requirement for higher arc power would lead, in certain cases, to a shortened arc, in other cases to a longer arc. Power regulation superposed on arc voltage regulation would therefore require additional computer circuits to be able to furnish the correct reference value for the arc current voltage regulating circuit. For that reason, the combination of power with furnace voltage is excluded.

If, however, the power regulation acts on the regulating element for the transformer voltage (furnace voltage), then the direction of action is unequivocal so that, for power regulation, only the transformer voltage need to be influenced. Regardless of whether current regulation or arc voltage regulation acts on the electrode adjustment, increasing the transformer voltage has the result that the arc power is increased and vice versa. It is therefore advisable to let the arc power regulation be effected by acting on the correcting variable and to let the regulation of the second value, namely the arc voltage or the current or the wear, be effected by way of the electrode adjustment.

Additionally, the following has been found. While impedance regulation, i.e. regulation based on the quotient of arc voltage and arc current, produces decoupling between the three regulating circuits of the three electrode adjustment devices compared to merely a current regulation, a power regulation which acts on the electrode adjustment would have the opposite result. Without additional measures the power regulation could become unstable due to the coupling occurring between the three regulating circuits. For this reason as well, it is recommended to have the power regulation effected by the correcting variable for the transformer voltage.

It has also been found that the arc length has a significantly greater influence on the wear of the furnace lining than does the arc current. The explanation for this is that a long arc offers more radiation surface with respect to the furnace lining, particularly if the upper portion of the arc length is no longer shielded by slag. Moreover, a long arc develops a more intensive gas stream which, due to the developing oblique position of the arc is deflected from the surface of the bath onto the furnace wall of the lining. The wear variable can thus preferably be influenced by adjusting the arc length, which corresponds to the arc voltage. Therefore, the regulating variable for furnace lining wear must be provided exclusively by acting on the electrode adjustment, i.e. on the reference variable for the arc voltage regulation. However, due to the great dependence of the wear variable on the arc length, or arc voltage, a combination of regulating variables for wear and arc voltage must be excluded.

The current regulation must always act on the remaining correcting variable, i.e. with a given transformer voltage, or furnace voltage, the current regulations must affect the electrode adjustment, i.e. they must make the desired values for the arc voltage the reference variables, for example by superposing the current regulating circuit on the arc voltage regulating circuit.

In the case of a furnace operating with a linear ohmic arc resistance, the current intensities and the phase angle increase steadily as the arc is shortened. Deviation of the current from the desired value thus provides an unequivocal direction, over the entire range from interrupted arc to short circuit with the bath, based on the sign, or polarity, of the deviation, as to the direction in which the electrode must be adjusted: the electrode must be raised if the current is too high and lowered if the current is too low.

Nonlinear dependency of the current on the arc length is no drawback since there is no urgent requirement for particularly fast current regulation. The rapid rise in current when an electrode that is lowered without current touches the bath is detected and regulated out in the fastest way possible by the arc voltage regulation.

If current and power are given as desired values, the current acts in this case, as described above, on the electrode adjustment in that the current regulator forms the reference value for the arc voltage regulator. The power regulator would provide the reference value for the second current regulator which itself acts on the stepping switch of the transformer and thus changes the transformer voltage.

Normally, the operator of a furnace will desire to utilize a current limit that is appropriate for the transformer and the electrodes and will introduce the desired arc power into the furnace. With a lower power requirement, he will thus attempt to accomplish this with a shorter arc unless the movement of the bath produces such large and rapid changes in the arc that the vertically moved inert masses are unable to follow at the desired speed. Short arcs have the known advantages of more intensive heat transfer to the bath and less lining wear.

If the arc power is reduced and the current is maintained at the original level, the electrode adjustment as well as the regulation of the transformer voltage must become active. The arc must be shortened and the increase in current produced thereby must be compensated again by reducing the furnace voltage.

According to a further feature of the invention, the regulating element for the transformer voltage is always actuated by a current regulating circuit on which is superposed, in the case of power regulation, a power regulating circuit. The power regulator superposed on the current regulator then furnishes the reference variable for the current regulator. In all cases, only the arc voltage regulator acts directly on the electrode adjustment.

The objects according to the invention are further achieved by the provision of apparatus for regulating an arc discharge furnace, which furnace has a lining, a plurality of electrodes disposed above a bath of conductive material, adjustable transformer means connected for applying to each electrode a voltage which causes an arc current proportional to the applied transformer voltage to flow between the electrode and the bath, voltage varying means for varying the voltage applied by the transformer to each electrode, and electrode height adjusting means for varying the vertical spacing between each electrode and the bath, the apparatus comprising:

signal generator means providing representations of desired values for a maximum of two of the following parameters: the voltage of the arc current produced by at least one electrode; the arc current produced by the at least one electrode; the power of the arc produced by the at least one electrode; a parameter which is proportional to the wear caused to the furnace lining by the arc produced by the at least one electrode; and a correcting variable for the voltage applied to the one electrode by the transformer;

measuring means connected for measuring the actual current and voltage of the arc produced by the at least one electrode and for producing representations of actual values for the arc voltage, arc current, arc power, and the parameter proportional to wear for the at least one electrode; and control means connected to the signal generator means and the measuring means, and to the voltage varying means and the electrode height adjusting means for controlling the voltage varying means as a function of a first one of the selected desired values and the height varying means as a function of the second one of the selected desired values; wherein the control means comprise: a first regulator connected for generating a signal for controlling the electrode height adjusting means; a second regulator connected for generating a signal for controlling the voltage varying means; a third regulator connected to the first regulator for supplying a signal for controlling the signal generated by the first regulator means; and a wear value regulator connected for supplying a signal to a selected one of the first and third regulators.

According to various embodiments of the invention, the control means further comprise a power regulator selectively connectable to the second regulator for supplying a signal for controlling the signal generated by the second regulator; the voltage varying means are constituted by a stepping switch drive forming a part of the transformer means; and the signal generator means comprise: an operating station including means for generating a signal for controlling and for selectively connecting the stepping switch drive to one of the operating station and the second regulator. The operator station can be controlled manually or by a program input.

This apparatus serves to attain the respective objectives mentioned above. In particular, it includes two separate current regulators of which one is connected with the transformer and the other with the voltage generator for the drive to raise the electrodes. The current regulator connected with the transformer can possibly be connected to a power regulator, with the power regulator being superposed on the current regulator and furnishing its reference variable.

Thus there are two possibilities for driving the advisably employed stepping switch for the transformer, either to feed the transformer voltage directly on the basis of a desired value or to set the stepping switch by means of the above-mentioned current regulator, on which a power regulator may be superposed. The drive to raise the electrodes is actuated by means of a voltage regulator, with the respective control voltage being furnished either by a current regulator or by a wear regulator or directly as a given desired value.

The stepping switch drive for the transformer as well as the voltage regulator may receive their given values, i.e. correcting variables, from an operating station at which the respective values are introduced manually or by means of the respective values are introduced manually or by means of a program.

Embodiments of the invention are illustrated in the drawing figures.

BRIEF DESCRIPTION OF THE DRAWING

FIG. 1 is a chart illustrating the regulating rules according to the method of the invention.

DESCRIPTION OF THE PREFERRED EMBODIMENTS

Figure 2:
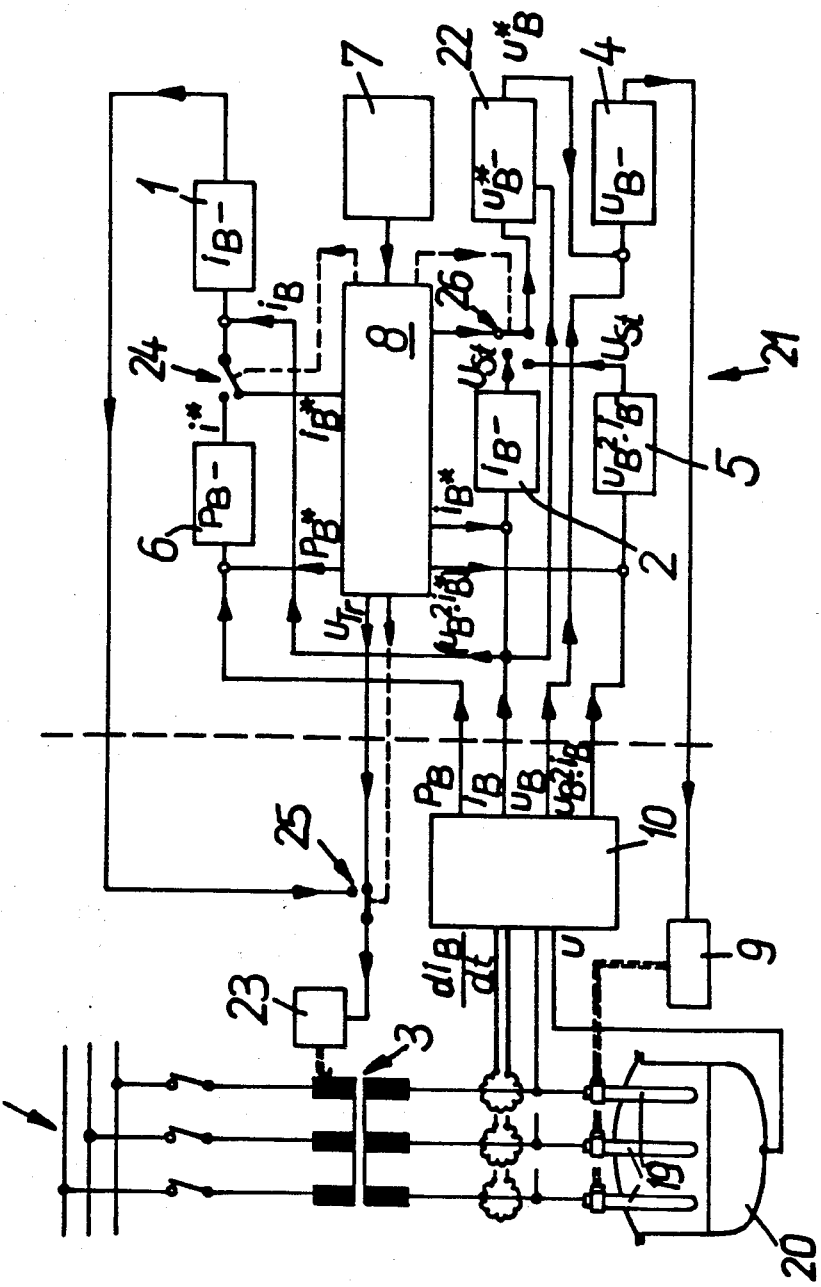
FIG. 2 is a block circuit diagram of a regulating device for implementing this method.

FIG. 1 shows how the two regulating variables to be selected must act to produce stable furnace operation.

A regulating variable 11 for the furnace voltage must always act, independently of course of the given values in the first (Transformer Voltage) column, on the transformer voltage regulating element 15 since the transformer voltage and furnace voltage are almost equal in magnitude.

The arc voltage regulating value 12 must correspondingly always act on the electrode adjustment 13, since arc length and arc voltage are substantially proportional to one another.

As shown in FIG. 1, a power regulation 14 must always act on the transformer voltage regulating element 15, while a regulation of the amount of wear 16, which is formed from the product of the square of the arc furnace voltage and the arc current, must always act on the electrode adjustment regulation 13. If the second regulating variable is an electrode current regulation 17, then the current regulation must always act on the correcting variable that is still unaffected, i.e. either on the correcting variable for the transformer voltage 15 or, as a superposed regulating variable, provide the reference variable for the arc voltage regulating circuit. The combinations of power width transformer voltage and wear with arc voltage must be excluded; the respective fields therefore remain unidentified.

The apparatus shown in FIG. 2 includes a furnace system 18 and a measuring device 10. The furnace system 18 essentially includes a transformer 3 equipped with a stepping switch drive 23 which controls the voltage between electrodes 19 and a bath 20. The measured values for current $i_B$ in each arc, voltage $u_B$ at each electrode, wear $u_B^2 \cdot i_B$ and power $p_B$ are derived in measuring device 10 from the current differential $di_B/dt$ and from the voltage, i.e. from a time derivation of the electrode current and the electrode voltage. Device 10 then obtains the associated current values by an integration operation. Electrode height adjustment is effected by way of an electrode displacing drive 9.

The apparatus further includes a regulating device 21 whose central component is a central operating station 8 which is used to furnish all desired values for electrode current, electrode power and wear coefficient. The stated desired values are each identified by an asterisk (*).

Operating station 8 can be directly connected to current regulator 1 and is directly connected individually with current regulator 2, a power regulator 6 and a wear regulator 5 so as to supply the respective desired values thereto. The above-mentioned regulators 1, 2, 5 and 6, and an electrode voltage regulator 4, are further connected with measuring device 10 so as to pick up the respectively measured actual values. Additionally, operating station 8 is also directly connected with the stepping switch drive 23 and, via a desired electrode voltage value generator 22, with voltage regulator 4 for the electrode raising drive 9. The output of voltage regulator 4 is connected directly to drive 9.

The desired electrode voltage value generated in voltage generator 22 is formed as a function of the measured electrode current $i_B$, for which purpose voltage generator 22 is connected directly with measuring device 10 as well as with operating station 8 from which it receives an input value. The output of generator 22 is connected to voltage regulator 4.

There is also provided a direct control for operating station 8 by means of a program input 7 connected therewith.

Switch drive 23 can be connected selectively via a switch 25 either to the output of $i_B$ regulator 1 or to operating station 8. The $i_B$ regulator 1 can be connected selectively via a switch 24 to receive either the desired arc current value from station 8 or a value from $p_B$ regulator 6. In the latter case, $p_B$ regulator 6 is superposed on $i_B$ regulator 1 and furnishes the reference variable for regulator 1.

Control possibilities for the drive 9 to raise and lower electrodes 19 are also provided in such a manner that the control signal for drive 9 is based on a desired value $U_{st}$ supplied to voltage generator 22 directly from operating station 8 or from current regulator 2 or from wear regulator 5. A switch 26 is provided for this purpose.

The above described system operates as follows. Operating station 8 furnishes the desired values for the regulating variables which are given either by manual setting in operating station 8 or by program input 7. Program input 7 may originate either from a fixed program or from a computer.

The drive 9 to raise the electrodes is always actuated via voltage regulator 4. According to the statements above, current regulator 2 and wear regulator 5 are able to act only as regulating circuits whose outputs are superposed on voltage regulator 4. A selected one of regulators 2 and 5 feeds its output value to voltage regulator 4 via a desired value generator 22.

Stepping switch drive 23 for furnace transformer 3 can be actuated directly by a control signal $U_{Tr}$ produced either by manual input to operating station 8 or by program input 7. If the transformer voltage is to be regulated, however, the actuation is controlled by current regulator 1. If power regulation is desired, power regulator 6 is superposed on current regulator 1.

The entire illustration relates to one of the three phases of a three-phase current system for an arc discharge furnace. But this does not mean that separate desired values must positively be given for all three phases. A decision whether separate or common desired values are to be given will substantially depend on whether the furnace transformer permits an asymmetrical setting of the transformer voltages or not. If necessary, the three phases can be made symmetrical in current regulator 1 for stepping switch drive 23.

Since power regulator 6 is operative in a regulating circuit only to produce a regulating value which is superposed on current regulator 1, a corresponding symmetrical arrangement would also be made in the case of power regulation.

For the power regulator in particular, it will be advisable to measure only the total power of the furnace system and, in the case of a furnace transformer 3 that can be set to be asymmetrical, the desired current value will be given only for a reference phase; for the other phases, the current will then be regulated indirectly via a symmetry device.

If the furnace transformer cannot be set to be asymmetrical, asymmetries in the currents or in the arc voltage or in both must be accepted. In this case as well, it is advisable to have power regulator 6 provide the desired current value only for one phase. This phase then determines the transformer stage that will be set, e.g. if the same arc voltages are given in all three phases, the current in the other two phases will inevitably result.

Figure 3:
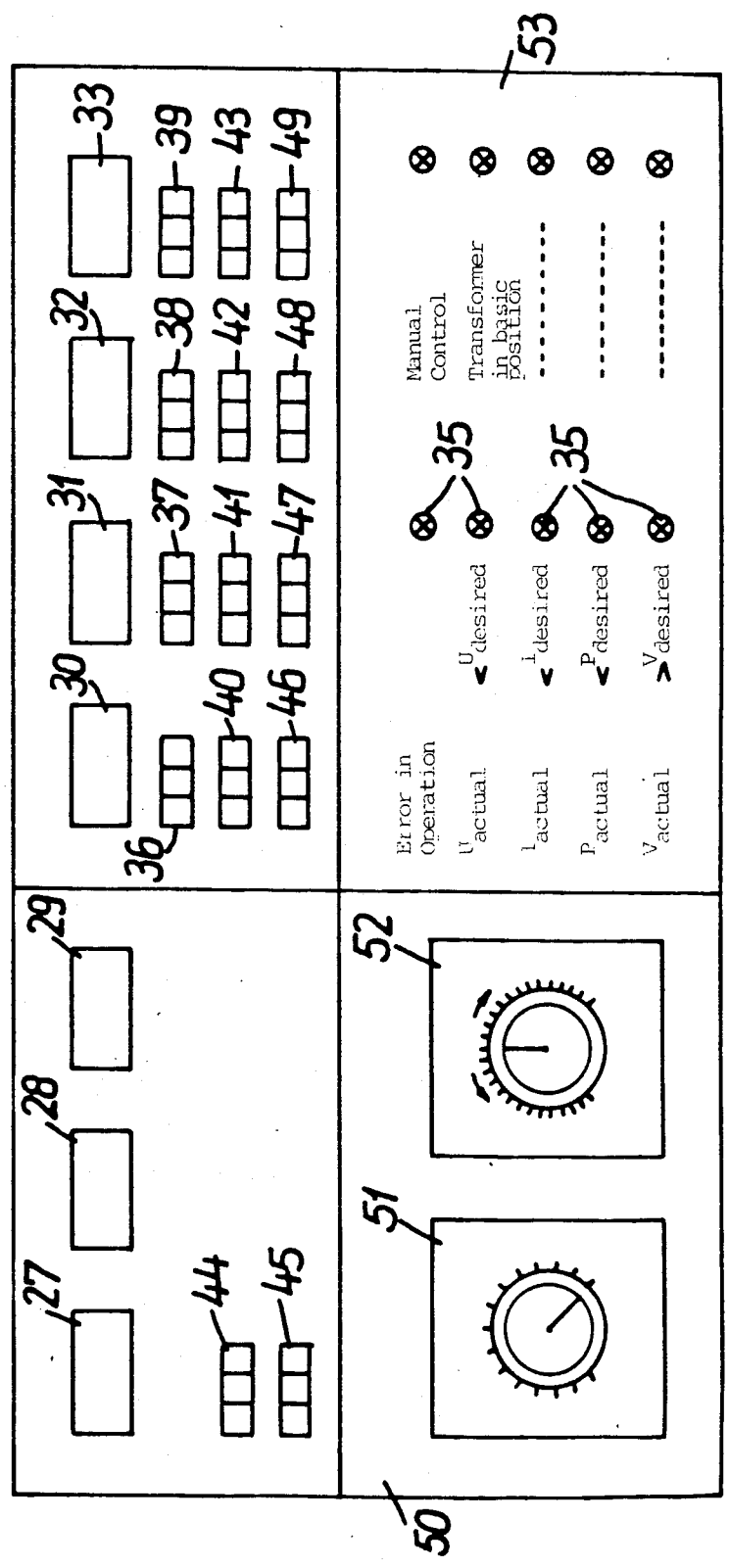
FIG. 3 is an elevational view of the front panel of an operating station for a furnace employing a measuring system.

In the embodiment of operating station 8 shown in FIG. 3, there is an upper row of selector keys 27 to 33, with which the desired combination of regulating variables can be selected, i.e. a combination of regulating values or a combination of regulating and correcting values. Selector key 29 is provided for computer controlled regulation. When actuated, the selected keys light up and thus indicate clearly the selected values. At the same time, a monitor 53 is informed that the respective key has been depressed. This permits detection of possible errors in operation which are displayed on a display composed of lamps 35.

A second row of switches 36 to 39 is provided for inputting the desired values for arc voltage, arc current, arc power and wear. To prevent errors, each one of the four possible desired values has its own coding switch.

A row of LED or LCD-7 segment displays 40 to 43 displays the desired values set via the row of switches 36-39. The desired transformer voltage value is displayed on a display 44. A further row of LED or LCD-7 segment displays 45 to 59 is provided to display the respective actual values. Since the desired values as well as the actual values are displayed, monitoring is possible even with computer controlled operation. A field 50 contains manual regulating elements 51 and 52 for continuous or stepwise setting of the transformer voltage and the electrode displacement velocity. The transformer can be switched in predetermined steps by means of stepping switch drive 23 under control of element 51. Electrode adjustment can be infinitely, or continuously, variable, as desired. As already mentioned above, errors in operation and deviations of actual values from the required desired values and similar values are displayed by lamps 35.

The operating station is operated as follows. If program key 29 is depressed, two desired values are taken from an external program whose data arrive at operating station 8 from program input 7. In all other cases, two of the remaining six keys in the top row of the operating field must be depressed.

For example, a typical procedure would require manual input of the transformer voltage, i.e. depressing the left-hand key 27 and operating regulating element 51 and, by depressing selector key 31, letting the system regulate itself to the desired value set therebelow. In the case of this combination, current regulation produced by regulator 2 would automatically act on the regulating element for electrode adjustment. The punching in of combinations which are not permitted according to FIG. 1, would automatically cause the lamp 35 associated with "error in operation" to light. Otherwise, it is left to the discretion of the operating personnel for the arc discharge furnace, which combination of two of the six keys are selected. A proper combination could be, for example, to give desired values for current and power. As already described above, in this case the current would act on the electrode regulation in that current regulator 2 forms the reference value for the arc voltage regulator. Power regulator 6 would furnish the reference value for the second current regulator 1 which itself would act on the stepping switch 23 of the transformer and thus change the transformer voltage. The desired values that can be set by the operating station are marked with an asterisk (*) in FIG. 2.

The invention which is the subject of this application is related to the subject matter of the following applications, filed by us on or about the same date as the present application and the subject matter of which is incorporated herein by reference:

Title: METHOD AND APPARATUS FOR ELECTRICALLY BALANCING THREE PHASE ARC DISCHARGE FURNACES claiming priority of Federal Republic of Germany Application P No. 35 12 177.7 of Apr. 3rd, 1985; and Title: METHOD FOR REGULATING THE ELECTRODES IN A FURNACE HAVING FREELY BURNING ELECTRIC ARCS claiming priority of Federal Republic of Germany Application P No. 35 12 178.5 of Apr. 3rd, 1985.

It will be understood that the above description of the present invention is susceptible to various modifications, changes and adaptations, and the same are intended to be comprehended within the meaning and range of equivalents of the appended claims.

What is claimed is:

1. A method for regulating an arc discharge furnace having a lining, a plurality of electrodes disposed above a bath of conductive material, adjustable transformer means connected for applying to each electrode a voltage which causes an arc current proportional to the applied transformer voltage to flow between the electrode and the bath, voltage varying means for varying the voltage applied by the transformer to each electrode, and electrode height adjusting means for varying the vertical spacing between each electrode and the bath, said method comprising:

selecting desired values for a maximum of two of the following parameters: $U_B$, which is the voltage of the arc current produced by one electrode; $i_B$, which is the arc current produced by the one electrode; $U_B \cdot i_B$, which is the power of the arc produced by the one electrode; $U_B^2 \cdot i_B$, which is proportional to the wear caused to the furnace lining by the arc produced by the one electrode; and furnace voltage acting as a correcting variable for the voltage applied to the one electrode by the transformer;

controlling the voltage varying means for varying the voltage applied by the transformer to the one electrode as a function of a first one of the selected desired values; and controlling the height adjusting means for varying the vertical spacing between the one electrode and the bath as a function of the second one of the selected desired values.

2. A method as defined in claim 1 wherein said step of varying the voltage is carried out as a function of the selected desired value for arc power.

3. A method as defined in claim 1 wherein said step of varying the vertical spacing is carried out as a function of the selected desired value for the parameter which is proportional to the furnace lining wear.

4. A method as defined in claim 1 wherein said step of varying the vertical spacing is carried out in order to regulate one of the arc voltage, the arc current, and the furnace lining wear.

5. A method as defined in claim 1 wherein said step of varying the vertical spacing is carried out in order to regulate arc voltage, and said step of varying the voltage is carried out in order to regulate one of arc current and power.

6. A method as defined in claim 1 wherein said step of varying the vertical spacing is carried out in order to regulate arc current and power, and said step of varying the voltage is carried out in order to regulate furnace lining wear.

7. A method as defined in claim 1 wherein said step of varying the voltage is carried out under control of a current regulating circuit.

8. A method as defined in claim 1 wherein said step of varying the voltage is carried out in order to regulate arc power under control of a current regulating circuit controlled by a power regulating circuit.

9. Apparatus for regulating an arc discharge furnace, which furnace has a lining, a plurality of electrodes disposed above a bath of conductive material, adjustable transformer means connected for applying to each electrode a voltage which causes an arc current proportional to the applied transformer voltage to flow between the electrode and the bath, voltage varying means for varying the voltage applied by the transformer to each electrode, and electrode height adjusting means for varying the vertical spacing between each electrode and the bath, said apparatus comprising:

signal generator means providing representations of desired values for a maximum of two of the following parameters: the voltage of the arc current produced by at least one electrode; the arc current produced by the at least one electrode; the power of the arc produced by the at least one electrode; a parameter which is proportional to the wear caused to the furnace lining by the arc produced by the at least one electrode; and the fornace voltage acting as a correcting variable for the voltage applied to the one electrode by the transformer;

measuring means connected for measuring the actual current and voltage of the arc produced by the at least one electrode for and for producing representations of actual values for the arc voltage, arc current, arc power, and the parameter proportional to wear for the at least one electrode; and control means connected to said signal generator means and said measuring means, and to the voltage varying means and the electrode height adjusting means for controlling the voltage varying means as a function of a first one of the selected desired values and the height adjusting means as a function of the second one of the selected desired values; wherein said control means comprise: a first regulator connected for generating a signal for controlling the electrode height adjusting means; a second regulator connected for generating a signal for controlling the voltage varying means; a third regulator connected to said first regulator for supplying a signal for controlling the signal generated by said first regulator means; and a wear value regulator connected for supplying a signal to a selected one of said first and third regulators.

10. Apparatus as defined in claim 9 wherein said control means further comprise a power regulator selectively connectable to said second regulator for supplying a signal for controlling the signal generated by said second regulator.

11. Apparatus as defined in claim 10 wherein the voltage varying means are constituted by a stepping switch drive forming a part of the transformer means.

12. Apparatus as defined in claim 11 wherein said signal generator means comprise: an operating station including means for generating a signal for controlling the stepping switch drive; and means for selectively connecting the stepping switch drive to one of said operating station and said second regulator.

13. Apparatus as defined in claim 12 wherein said operating station is manually operated.

14. Apparatus as defined in claim 12 wherein said operating station is controlled by a program input.

15. Apparatus as defined in claim 9 wherein said signal generator means comprise an operating station including means for generating a signal for controlling said first regulator.

16. Apparatus as defined in claim 15 wherein said operating station is manually operated.

17. Apparatus as defined in claim 15 wherein said operating station is controlled by a program input.

* * * * *